United States Patent [19]
Roskowski et al.

[11] Patent Number: 5,257,385
[45] Date of Patent: Oct. 26, 1993

[54] APPARATUS FOR PROVIDING PRIORITY ARBITRATION IN A COMPUTER SYSTEM INTERCONNECT

[75] Inventors: Steven G. Roskowski, Sunnyvale; Dean M. Drako, Cupertino; William T. Krein, San Jose, all of Calif.

[73] Assignee: Apple Computer, Inc., Cupertino, Calif.

[21] Appl. No.: 815,825

[22] Filed: Dec. 30, 1991

[51] Int. Cl.⁵ .............................................. G06F 13/14
[52] U.S. Cl. .................... 395/725; 395/325; 364/242.92; 364/242.8; 364/DIG. 1; 364/935.41; 364/DIG. 2
[58] Field of Search ............... 395/725, 325, 200; 364/242.92, 242.8, DIG. 1, 935.41, DIG. 2; 340/825.5

[56] References Cited
U.S. PATENT DOCUMENTS
4,920,486  4/1990  Nielsen ....................... 395/325
4,953,081  8/1990  Feal et al. .................... 395/325
5,151,994  9/1992  Wille et al. .................. 395/800

Primary Examiner—Michael R. Fleming
Assistant Examiner—Glenn A. Auve
Attorney, Agent, or Firm—Blakely, Sokoloff, Taylor & Zafman

[57] ABSTRACT

A circuit which includes apparatus for determining for at each node of a multi-node interconnect the highest priority data present for transfer to that node, apparatus for storing information indicating the last node from which a transfer of data occurred at each priority level, apparatus for selecting for each priority level of data available at the node the last node from which a transfer of data occurred at each priority level, apparatus for weighting data at each priority level depending on the data last chosen at that level of priority, and means for selecting from all of the data available at each node the data having both the highest priority and having been chosen least recently at that priority levels of data at that node.

18 Claims, 2 Drawing Sheets

APPARATUS FOR PROVIDING PRIORITY ARBITRATION IN A COMPUTER SYSTEM INTERCONNECT

FIELD OF THE INVENTION

This invention relates to computer systems and, more particularly, to methods and apparatus for selecting on the basis of priority the information to be transferred by a computer interconnect.

HISTORY OF THE PRIOR ART

Computer systems usually employ busing arrangements to transfer information between the individual components of the system. Such busing arrangements are capable of handling data from a single source component at a time. Consequently, such busing arrangements include some means for deciding which data is to be transferred first. Such means for deciding are referred to as arbitration circuits. When a source component desires to write data to some other destination component, it signals that the data is ready and provides an address to which the data is to be written. If more than one source component has data to transfer, the arbitration circuitry decides from which source to transfer data first. This determination is often based on some sort of criteria such as which source component is sending the data. The arbitration circuit looks at all of the various sources of data available for transfer in the system and selects one source to transfer data based on the particular criteria. One particularly valuable criteria for arbitration would be a value assigned to each transaction by the source transmitting the data. In this specification, such a value will be referred to as the priority of the data.

U.S. patent application Ser. No. 07/816,346, entitled INTERCONNECT SYSTEM ARCHITECTURE, Roskowski et al, filed Dec. 30, 1991, and assigned to the assignee of the present invention, discloses a high speed interconnect for a computer system which allows a plurality of data sources to transfer a very large amount of data to a plurality of destinations concurrently. While the typical computer system utilizes a busing arrangement as the interconnection to transfer data from one component of the system to another, the requirements for pathways to handle more and more information faster have increased to the point that various functions cannot be performed by the conventional busing arrangement. Functions such as the presentation of animated graphics and television require the transfer of so much data that the entire busing arrangement must be devoted to their use. When it is desired to incorporate a number of these functions into the same computer system and to run more than one of these operations at once, a typical busing arrangement is incapable of supporting the required bandwidth.

The interconnect of the above-mentioned patent application includes a plurality of nodes each of which is capable of joining to a component of a computer. Each node comprises apparatus for transferring signals between the component and the node including apparatus for automatically translating between data formats. Each node also includes circuitry for storing a plurality of multiword packets of data from the associated component. Circuitry is also provided at each node for signalling each other node that a packet of data exists for transfer to the component associated with that node and for sensing signals from another node indicating that a packet of data exists for transfer to the component associated with that node. Finally, each node is connected to each other node by circuitry for transferring packets of data stored at one node to another node.

This interconnect essentially provides a plurality of individual paths which may simultaneously transfer data between each of the components of a computer system and between each of those components and any system peripherals connected by means of the interconnect. The interconnect disclosed in the above-mentioned patent application operates to transfer data very rapidly between components. For example, a simple interconnect of this type connecting four components of a computer system is capable of transferring four times as much data as can the most advanced busing arrangements.

One reason the interconnect disclosed in the above-mentioned patent application operates so rapidly to transfer data between components is because such data is transferred in packets. Transferring data in packets, however, means that the time required for individual transfers is usually longer than the time required for transfer of single words as in an ordinary busing system. Since these transfers take a longer time, conflicts between data are more likely. Consequently, arbitration arrangements for determining which data is next to be transferred are especially important to such a system.

SUMMARY OF THE INVENTION

It is, therefore, an object of the present invention to provide arrangements for selecting a transfer based on the priority of the data involved in a high speed computer interconnect.

It is another more specific object of the present invention to provide arrangements for selecting a transfer based on the priority of the data involved in a high speed computer interconnect which arrangements operate to transfer the highest priority of data and to select fairly among data of the same highest priority to be transferred.

These and other objects of the present invention are realized in a circuit which comprises apparatus for determining at each node the highest priority data present for transfer to that node, apparatus for storing information indicating the last node from which a transfer of data to that node occurred at each priority level, apparatus for selecting for each priority level of data available at the node the last node from which a transfer of data occurred at each priority level, apparatus for weighting data at each priority level depending on the node from which data was last transferred at that level of priority, and means for selecting from all of the data available at each node the data having both the highest priority and being from the node having been chosen least recently at that priority level of data for transfer to that node.

These and other objects and features of the invention will be better understood by reference to the detailed description which follows taken together with the drawings in which like elements are referred to by like designations throughout the several views.

NOTATION AND NOMENCLATURE

Figure 1:
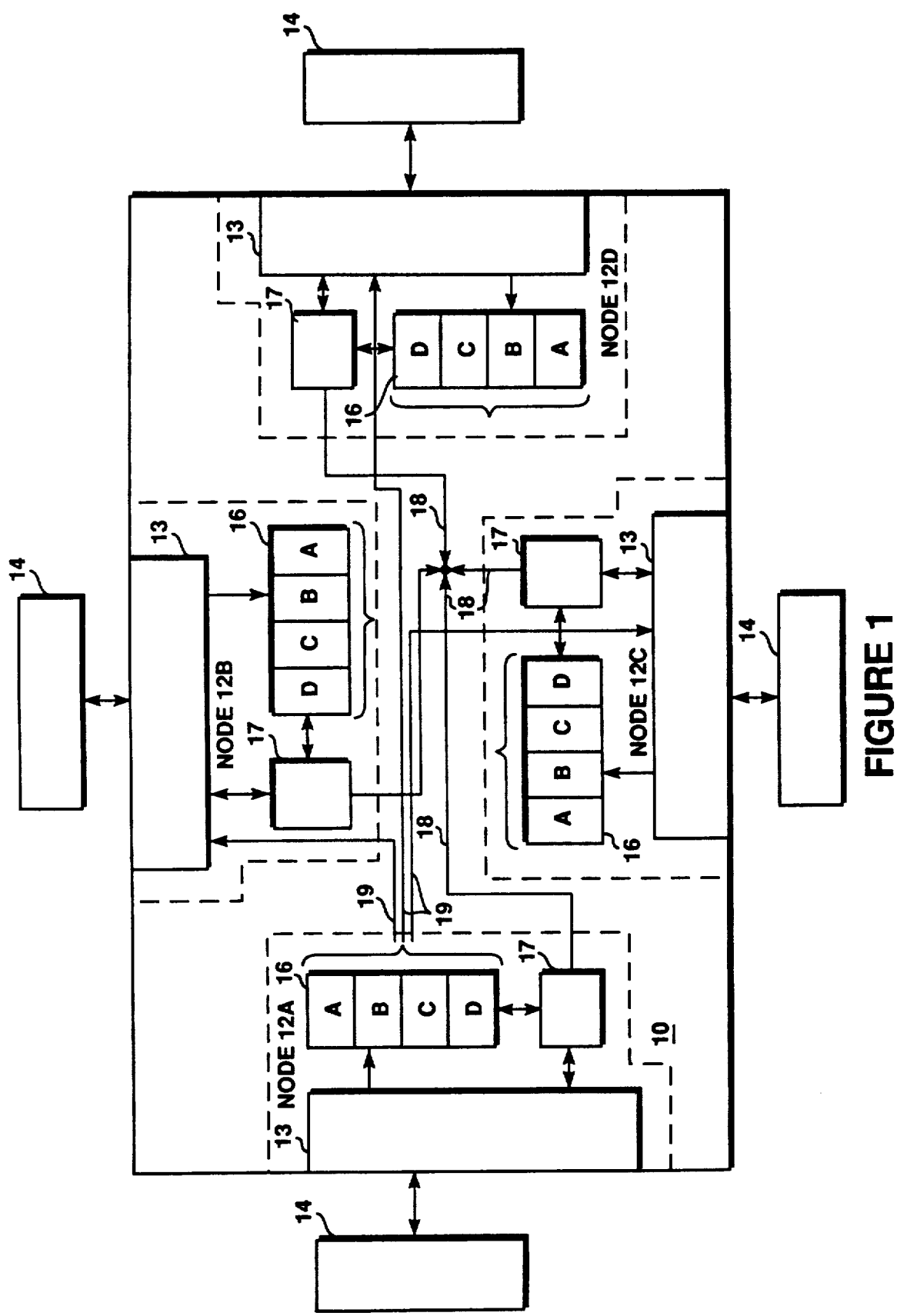
FIG. 1 is an interconnect designed in accordance with the above-mentioned patent application.

Some portions of the detailed descriptions which follow are presented in terms of representations of operations on data bits within a computer memory. These descriptions and representations are the means used by those skilled in the data processing arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

In order to facilitate the rapid transfer of data by means of a computer system interconnect, whether that interconnect be a busing arrangement or other interconnect arrangement, it is necessary to provide circuitry for arbitrating among the various pieces of data available in order to determine which data is (under some system, whether arbitrary or not) the data which should be transferred first. Without this ability, a computer will handle operations in a haphazard order and will, without some form of control, probably come to a halt. As pointed out above, the determination is often based on some sort of criteria such as which source component is sending the data. For example, data sent from a component residing in a particular slot (at a particular node) of a computer may be chosen first. The arbitration circuit looks at all of the various sources of data available for transfer in the system and selects the one in the most important slot as the one source to transfer data.

This is not an especially good criteria for selecting the information to be first transferred. It does not take into account that some information from a given slot may be more important to the operation of the system or a program than other information from that slot.

A much better method for selecting data to be first transferred by a computer interconnect, especially a fast computer system, is to use a value or priority assigned to each piece of data by the source of that data. Since a source of data will generally have a good understanding of the data which is most important, this criteria for arbitration will provide for faster system operation. Using this criteria, a computer may handle first that data which is most important to its operation as defined by the various sources and may delay the transfer of data which is less essential to its operation. This is especially important in systems which rely on a busing arrangement for transfer of data between system components since in a busing system, only one piece of data may be transferred at any time by the busing arrangement.

A system for selecting based on the priority of a transfer of data is also important in an interconnect system which allows the transfer of data between a plurality of components simultaneously if it is desired that the interconnect system operate to transfer data as efficiently as possible. The circuitry of the present invention operates to accomplish that function.

Referring now to FIG. 1, there is illustrated an interconnect 10 designed in accordance with the above-mentioned patent application. The interconnect 10 illustrated includes four nodes 12 each of which nodes may be connected by an interface 13 to a computer system component or peripheral 14. Each node 12 includes circuitry 16 for receiving and storing data from the associated component 14 in a plurality of packets. In the embodiment illustrated, four individual storage areas for storing packets are illustrated; these storage areas are individually referred to by the letters A, B, C, and D in the figure. In the interconnect 10 designed in accordance with the above-mentioned patent application, each packet may comprise up to sixty-four bytes of data.

Also included at each node 12 is control circuitry 17 which is adapted to utilize information provided by the components 14 to control the transfer of the data at any node 12 to a component 14 connected to any other node 12. The control circuitry 17 of each node 12 is connected to transfer control information to the control circuitry 17 of each other node by a launch bus or buses 18.

Among the information provided by a component regarding each packet of data to be transferred is the destination for the data and the priority of the data. In any particular computer system utilizing the interconnect 10, the determination of the priority levels will depend upon the requirements of the particular source and for the purposes of this invention may be considered to be arbitrary. This priority information along with other control information is sent on the launch bus 18 from the control circuitry 17 of the source node 12 to the control circuitry 17 of the destination node 12. The circuitry for controlling the priority arbitration is included within the control circuitry 17 illustrated in FIG. 1 and may be considered to be part of each destination node 12.

The packets of data held in the storage circuitry 16 at each source node 12 are transferred from the circuitry 16 under control of the control circuitry 13 by directly-connected data paths 19 to the interface 13 of each other node. Only one set of direct connections is illustrated in FIG. 1 (the connections from the node 12 at the left of the figure) in order to simplify the drawing.

Figure 2:
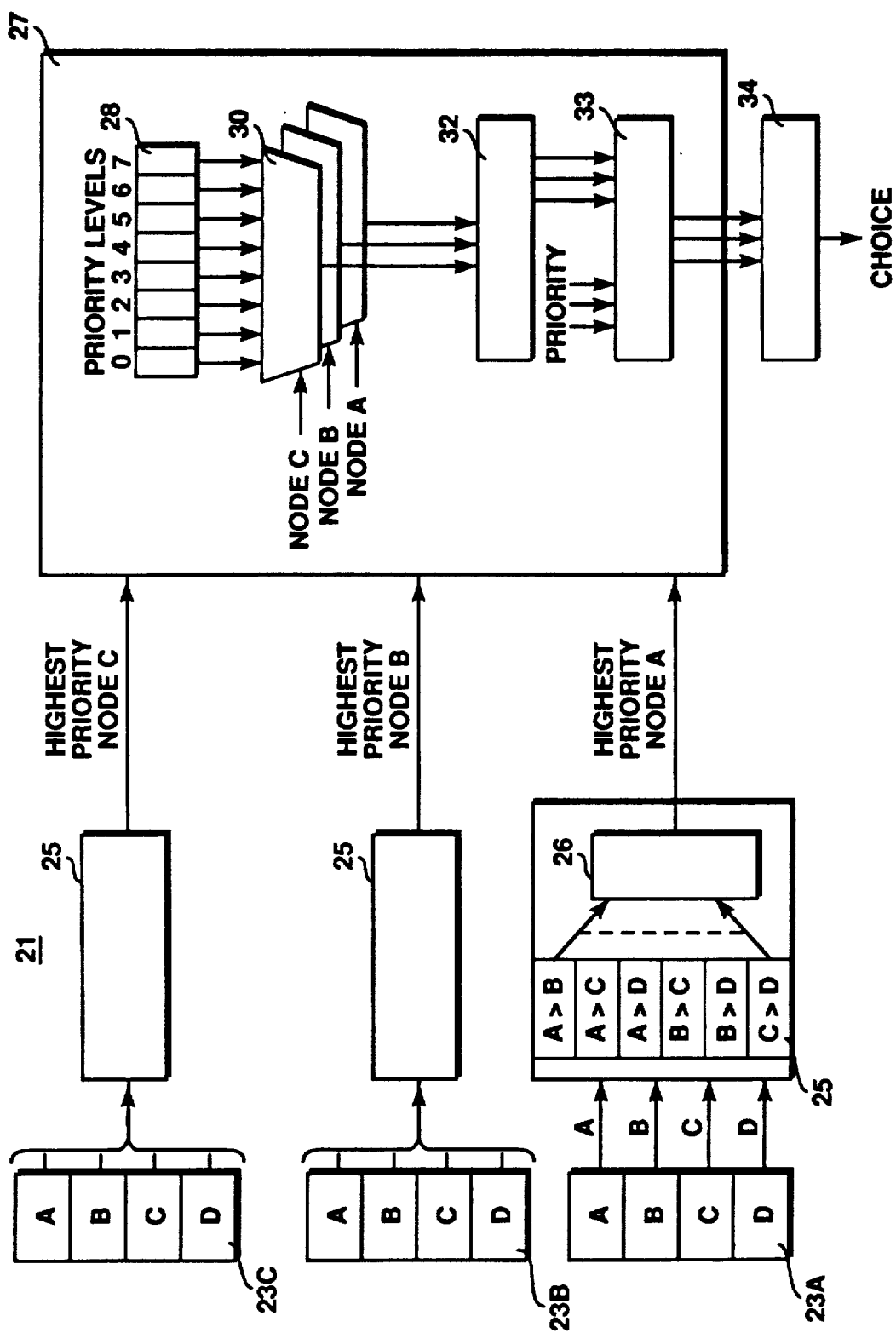
FIG. 2 is a block diagram illustrating the priority arbitration circuitry of this invention.

FIG. 2 illustrates the priority arbitration circuitry 21 at any single destination node 12. The circuitry 21 at each node 12 (node D is illustrated) includes a set of registers 23 for storing information regarding the packets of data stored at the circuitry 16 of each other node 12. Three sets of registers 23A, 23B, and 23C are illustrated for storing information (referred to as header information in the above-mentioned patent application) about each of the individual packets of data which may be stored at each of the source nodes 12. Each register A-D of each register set 23A-C is associated with a particular one of the storage areas at a particular node 12. Thus, the lower set of registers 23A stores information regarding the packets of data in storage areas A-D at node A. The middle set of registers 23B stores information regarding the packets of data in storage areas A-D at node B. The highest set of registers 23C stores information regarding the packets of data in storage areas A-D at node C. For the purpose of this invention, the information stored includes data defining the priority of the information stored in the particular packet at the source node 12. In the preferred embodiment of the invention, a total of eight priority levels (indicated by three binary bits) which are herein designated as levels 0-7 are utilized; of these, level 0 is the lowest priority and, consequently, the last to be transferred while level 7 is the highest priority and the first to be transferred.

In the interconnect 10 disclosed in the above-mentioned patent application, circuitry is provided in the control circuitry 17 of each source node 12 for assuring that only the first to be received packet of any particular priority level may be placed in storage in circuitry 16. Circuitry for accomplishing this is disclosed in United States patent application, Ser. No. 07/815,816, entitled APPARATUS FOR CONTROLLING THE FLOW OF DATA THROUGH A COMPUTER BASED ON THE REQUIREMENTS OF A DESTINATION COMPONENT, Roskowski et al, filed Dec. 30, 1991, and assigned to the assignee of the present invention. Because of the provision of such circuitry, the four registers A-D of any register set 23A-C containing information representing any one node of the interconnect 10 will contain information regarding only a single packet at any particular level of priority.

The priority information regarding the packets stored in each of the storage areas A-D of a particular node are compared in a comparator circuit 25. The comparator circuit 25 associated with each set of registers 23 tests the priority of the data stored in each storage area within the particular node 12 and provides an output signal which indicates which storage area of the source node contains the highest priority data. In the preferred embodiment, this is accomplished by individually comparing the bits indicating the priority of the data in each storage area to the bits indicating the priority level of the data in each other storage area of the particular node 12. For example, the priority of the packet in storage area A is compared to the priority of the packet in each of storage areas B, C, and D; the priority of the packet in storage area B is compared to the priority of the packet in each of storage areas C and D; and the priority o the packet in storage area C is compared to the priority of the packet in storage area D. The results of these six comparisons are evaluated by logic circuitry 26 to provide an output indicating the storage area containing the packet of data of highest priority for the particular node 12.

The results of the comparisons to determine the highest priority level of data stored at each node 12 are transferred as a signal indicating this highest priority level to a circuit 27. In the preferred embodiment, this signal includes three bits of binary data for indicating one of the eight possible levels of priority. The purpose of the circuit 27 is to determine first the highest level o priority at all of the nodes s that the highest priority data may be transferred first to the destination node; and second, if two nodes store data of the same highest priority, to determine the last node to transfer data at that highest priority level so that the node 12 which least recently transferred data may be selected. This choice of nodes renders the transfer selection fair to all sources of data within the particular highest priority level.

To accomplish these objects, the circuit 27 includes a first set of eight registers 28. Each register of the set stores an indication of the last node 12 from which data was transferred for a single one of the eight levels of priority; thus, each register handles a single priority level. In the embodiment illustrated in which the interconnect 10 includes four nodes, two bits of information stored in each of the registers of the set of registers 28 are sufficient to indicate the last node to provide data at each level of priority. The node A, for example, may be assigned a designation of 00; the node B a designation of 01; and the node C a designation of 10 (which indicate in binary the values zero, one, and two). The presence of one of these values in one of the set of registers 28 indicates the node which last transferred data at the priority level of that register.

The circuit 27 also includes a set of multiplexors 30, each associated with one of the circuits 25. Each multiplexor 30 is connected to receive inputs of each of the eight registers of the set 28. An output signal provided from each of the circuits 25 associated with registers 2 related to a particular node 12 indicates the highest priority stored at that node 12. This signal causes the associated multiplexor 30 to select the particular register 28 storing the two bits indicating the last node from which data was transferred at that highest priority level for each of the three circuits 25. Thus, a signal from the upper circuit 25 indicating that the highest priority packet stored at node C has a five priority causes the multiplexor 30 associated with the upper circuit 25 to transfer a two bit signal indicating the node 12 from which the last data having a five priority was transferred. On the other hand, a signal from the middle circuit 25 indicating that the highest priority packet stored at node B has a four priority causes the multiplexor 30 associated with the middle circuit 25 to transfer a two bit signal indicating the node 12 from which the last data having a four priority was transferred. The signal from the lower circuit 25 causes the third multiplexor 30 to function in the same manner.

The signals from the three multiplexors 30 are transferred to a circuit 32 which adds to each signal a value determined by the number of the node 12 with which the particular multiplexor 30 is associated. This value is selected for each source node such that when added with the value from the multiplexor 30 indicating the last node to transfer a value of that priority provides a lowest sum for the node from which information was last transferred. In the preferred embodiment, this is accomplished by selecting a value which when added to the two bit signal designating that node will total zero in the lowest two bits indicating the lowest priority. For example, the node A which has a designation of 00 is assigned a value to be added of 00 The node B which has a designation of 01 is assigned a value to be added of 11; and the node C which has a designation of 10 is assigned a value to be added of 10. The value 00 is added to two bits transferred by the associated multiplexor 30 of the node A. The value 11 is added to each set of two bits transferred by the associated multiplexor 30 of the node B. The value 10 is added to each set of two bits transferred by the associated multiplexor 30 of the node C. It will be recognized that the addition of each of these last-node designators and assigned values produce a binary value of 00 in the two lowest order digits at the last node to have transferred data of a particular priority. This guarantees that if a given node was the last to transfer data, it will have a weighting of zero on the next transfer. Thus, presuming a priority five signal is the highest level signal held at each of the nodes A, B, and C, the order of selection is provided by the highest value of the two bits provided by the addition. For example, if the last node 12 to transfer a priority five package was node A, the two bit value in the register 28 for priority five is 00. When the value 10 used for node C is added to 00, a total of 10 (digital two) is realized. When the value 11 used for node B is added to 00, a total of 11 (digital three) is realized. When the value 00 used for node A is added to 00, a total of 00 (digital zero) is realized. Thus, of the three packets, the higher valued node B packet is chosen. On the other hand, had the last node to transfer a priority five packet been node C, then the designator 10 would be stored in the priority five register 28. The addition of values for each of the nodes would produce the total values of 10 plus 10 (00) for node C, 10 plus 11 (01) for node B, and 10 plus 00 (10) for node A indicating that node A should be first selected.

If any node had stored instead of five priority data, a lower priority packet as its highest priority packet, then the node designator of the last transferred data is added to the addition value for that node. For example, if the node A is presumed to store a priority four packet as its highest valued packet, the two bit indicator for the last to be selected node for priority four stored in the registers 28 is added to the addition value 00 assigned to the node A. Thus, in no case is the last node to have transferred a packet of data at a particular priority chosen unless it is the only packet of data at that priority level waiting for transfer to the destination node. Instead, the source nodes are selected in case of a conflict on a round robin basis (e.g., node A, B, C).

The added values which provide the information indicating which node is to be chosen first within a priority level are transferred from the adders 32 and combined with three bit values indicating the highest priority level for the node by a circuit 33. The highest priority level for the node provides the three highest level bits of the combination, and the value which is the sum of the last-chosen node designator and the added value for the particular node provides the lowest two bits. Thus, the node C with a five priority packet produces a combination 10110 where node A was the last priority five packet transferred while the node B produces a combination 10111 for the same factors. If at the same time the highest priority packet is four at node A, then a combination of 011?? is produced where the question marks indicate the two bit sum of 00 and whatever was the last node to transfer a priority four packet. The combined signal for each node is transferred to a comparator circuit 34 which selects the highest valued signal. This signal will be the highest priority signal of all of the signals from the three nodes since the priority values provide the highest order bits. The number will also be from the least-recently-chosen node since the lowest two bits are highest in value for that node. Thus, the highest priority data will be chosen based on the fairness (least-recently-used) criteria explained above in the case of two or more signals having the same highest priority.

The indication of the packet selected is used by the control circuit 17 of the destination device to signal the control circuit 17 of the selected source node 12 which packet in the storage circuitry 16 is to be transferred. After the transfer has been accomplished, the bits in the register 28 indicating the last selected node for the priority selected are changed to reflect the new last-selected node value.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for use with an interconnect for a computer which interconnect includes a plurality of nodes for connection to components of the computer and in which data is transferred between nodes based on a plurality of priority levels, the circuit comprising means for determining at a node of the interconnect a highest priority level of data present for transfer to that node, means for storing information indicating a las node from which a transfer of data occurred at each priority level, means for selecting for each priority level of data available at a node a last node from which a transfer of data occurred at each priority level, means for weighting data at each priority level depending on which data was last chosen at that level of priority, and means for selecting from all of a plurality of data available at a node data having both a highest priority level and having been chosen least recently at that priority level of data at that node based on the weights obtained.

2. A circuit for use with an interconnect for a computer which interconnect includes a plurality of nodes for connection to components of the computer as claimed in claim 1 wherein the means for determining at a node of the interconnect a highest priority level of data present for transfer to that node comprises means for comparing levels of priority of data to be transferred from any node.

3. A circuit for use with an interconnect for a computer which interconnect includes a plurality of nodes for connection to components of the computer as claimed in claim 2 wherein the means for storing information indicating a last node from which a transfer of data occurred at each priority level, comprises a set of registers, each register f the set being adapted to store information indicating a last node for one particular level of priority.

4. A circuit for use with an interconnect for a computer which interconnect includes a plurality of nodes for connection to components of the computer as claimed in claim 3 wherein the means for weighting data at each priority level depending on which data was last chosen at that level of priority comprises means for adding a value for each particular node to a node designator stored by the apparatus for storing information indicating a last node from which a transfer of data occurred at each priority level.

5. A circuit for use with an interconnect for a computer which interconnect includes a plurality of nodes for connection to components of the computer as claimed in claim 4 wherein the means for adding a value for each particular node to a node designator stored by the means for storing information indicating a last node from which a transfer of data occurred at each priority level adds a value chosen to zero a lowest two bits of the node designator.

6. A circuit for use with an interconnect for a computer which interconnect includes a plurality of nodes for connection to components of the computer as claimed in claim 4 wherein the means for weighting data at each priority level depending on which data was last chosen at that level of priority comprises means for selecting for a node the information indicating a last node from which a transfer of data occurred at each priority level from the means for storing information indicating a last node from which a transfer of data occurred at each priority level.

7. A circuit for use with an interconnect for a computer which interconnect includes a plurality of nodes for connection to components of the computer as claimed in claim 6 wherein the means for selecting from all of a plurality of data available at a node data having both a highest priority level and having been chosen least recently at that priority level of data at that node based on the weights obtained comprises means for comparing values of signals indicating a highest priority level at a node and when that node last transferred data at that priority level.

8. A circuit for use with an interconnect for a computer which interconnect includes a plurality of nodes for connection to components of the computer as claimed in claim 2 wherein the means for weighting data at each priority level depending on which data was last chosen at that level of priority comprises means for adding a value for each particular node to a node designator stored by the means for storing information indicating a last node from which a transfer of data occurred at each priority level.

9. A circuit for use with an interconnect for a computer which interconnect includes a plurality of nodes for connection to components of the computer as claimed in claim 8 wherein the means for adding a value for each particular node to a node designator stored by the means for storing information indicating a last node from which a transfer of data occurred at each priority level adds a value chosen to zero a lowest two bits of the node designator.

10. A circuit for use with an interconnect for a computer which interconnect includes a plurality of nodes for connection to components of the computer as claimed in claim 8 wherein the means for weighting data at each priority level depending on which data was last chosen at that level of priority comprises means for selecting for a node the information indicating a last node from which a transfer of data occurred at each priority level from the means for storing information indicating a last node from which a transfer of data occurred at each priority level.

11. A circuit for use with an interconnect for a computer which interconnect includes a plurality of nodes for connection to components of the computer as claimed in claim 10 wherein the means for selecting from all of a plurality of data available at a node data having both a highest priority level and having been chosen least recently at that priority level of data at that node based on the weights obtained comprises means for comparing values of signals indicating a highest priority level at a node and when that node last transferred data at that priority level.

12. A circuit for use with an interconnect for a computer which interconnect includes a plurality of nodes for connection to components of the computer as claimed in claim 2 wherein the means for selecting rom all of a plurality of data available at a node data having both a highest priority level and having been chosen least recently at that priority level of data at that node based on the weights obtained comprises means for comparing values of signals indicating the highest priority level at a node and when that node last transferred data at that priority level.

13. A circuit for use with an interconnect for a computer which interconnect includes a plurality of nodes for connection to components of the computer as claimed in claim 1 wherein the means for storing information indicating a last node from which a transfer of data occurred at each priority level comprises a set of registers, each register of the set being adapted to store information indicating a last node for one particular level of priority.

14. A circuit for use with an interconnect for a computer which interconnect includes a plurality of nodes for connection to components of the computer as claimed in claim 1 wherein the means for weighting data at each priority level depending on which data was last chosen at that level of priority, comprises means for adding a value for each particular node to a node designator stored by the apparatus for storing information indicating a last node from which a transfer of data occurred at each priority level.

15. A circuit for use with an interconnect for a computer which interconnect includes a plurality of nodes for connection to components of the computer as claimed in claim 14 wherein the means for adding a value for each particular node to a node designator stored by the means for storing information indicating a last node from which a transfer of data occurred at each priority level adds a value chosen to zero a lowest two bits of the node designator.

16. A circuit for use with an interconnect for a computer which interconnect includes a plurality of nodes for connection to components of the computer as claimed in claim 14 wherein the means for weighting data at each priority level depending on which data was last chosen at that level of priority, comprises means for selecting for a node the information indicating a last node from which a transfer of data occurred at each priority level from the means for storing information indicating a last node from which a transfer of data occurred at each priority level.

17. A circuit for use with an interconnect for a computer which interconnect includes a plurality of nodes for connection to components of the computer as claimed in claim 1 wherein the means for selecting from all of a plurality of data available at a node data having both a highest priority level and having been chosen least recently at that priority level of data at that node based on the weights obtained comprises means for comparing values of signals indicating a highest priority level at a node and when that node last transferred data at that priority level.

18. A circuit for use with an interconnect for a computer which interconnect includes a plurality of nodes connecting to components of the computer and in which data is transferred between nodes based on a plurality of priority levels comprising means for determining a highest priority of data available for transfer to a node, means for storing information indicating a last node from which a transfer of data occurred at each priority level, means for selecting for each priority level of data available a last node from which a transfer of data occurred at each priority level, means for weighting data available at each priority level depending on the data last chosen at that level of priority, and means for selecting from all data available at each node data having both highest priority and having been chosen least recently at that priority level of data based on the weights obtained.

* * * * *